(12) United States Patent
Linn (10) Patent No.: US 7,043,356 B2
(45) Date of Patent: May 9, 2006

(54) METHOD AND APPARATUS FOR UPDATING UNFINISHED DESTINATIONS SPECIFIED IN NAVIGATION SYSTEM

(75) Inventor: Jian-Liang Linn, Rowland Heights, CA (US)

(73) Assignee: Alpine Electronics, Inc, Tokyo (JP)

( * ) Notice: Subject to any disclaimer, the term of this patent is extended or adjusted under 35 U.S.C. 154(b) by 159 days.

(21) Appl. No.: 10/704,349

(22) Filed: Nov. 6, 2003

(65) Prior Publication Data

US 2005/0102099 A1 May 12, 2005

(51) Int. Cl.
*G01C 21/00* (2006.01)
(52) U.S. Cl. ...................... 701/200; 701/201
(58) Field of Classification Search ........ 701/200–202, 701/204, 208–209, 211, 23, 25; 340/994, 340/995.1, 988
See application file for complete search history.

(56) References Cited

U.S. PATENT DOCUMENTS 5,243,529 A * 9/1993 Kashiwazaki ............... 701/208
2002/0165661 A1 11/2002 Horikami

* cited by examiner

*Primary Examiner*—Yonel Beaulieu
(74) *Attorney, Agent, or Firm*—Muramatsu & Associates (57) ABSTRACT

A method and apparatus for a navigation system to update unfinished destinations set in the navigation system when one or more destinations have not been reached within a predetermined time limit. The method includes the steps of inputting one or more destinations in the navigation system, measuring a time passage for each destination starting from a time when the destination is set in the navigation system, comparing the measured time passage with a predetermined time limit which is a time length commonly applied to all of the destinations and reporting the user that the destination is expired when the time passage exceeds a predetermined time limit, and deleting or renewing the expired destination in response to the user's instruction. When the expired destination is renewed, a time passage for the renewed destination is newly measured from a time of the renewal.

20 Claims, 9 Drawing Sheets

Prior Art

Prior Art

Next Day

| Today | Destination | Time |
|---|---|---|
| | 15435 Jeffrey Rd. Irvine | 16hrs |
| | 222 Pink ave, Tustin | 22hrs |
| | LAX Airport | 0hrs |
| | 444 Blue ave, Encinada | 15hrs |
| | La la land | 11hrs |
| | 1900 Beach Blvd, Anaheim | 17hrs |
| | 4200 Yellow st., Long Beach | 5hrs |
| | 14 Hollywood blvd, Hollywood | 8hrs |

Today's Plan Update — 72

| Today | Destination | Time |
|---|---|---|
| | 15435 Jeffrey Rd. Irvine | 16hrs |
| | 222 Pink ave, Tustin | 22hrs |
| | | |
| | 444 Blue ave, Encinada | 15hrs |
| | La la land | 11hrs |
| | 1900 Beach Blvd, Anaheim | 17hrs |
| | 4200 Yellow st., Long Beach | 5hrs |
| | 14 Hollywood blvd, Hollywood | 8hrs |

Today's Plan Update — 72

Fig. 7A

| Today | Destination | Time |
|---|---|---|
| Today's Plan Update | 15435 Jeffrey Rd. Irvine | 16hrs |
| | 222 Pink ave, Tustin | 22hrs |
| | LAX Airport | 0hr |
| | 444 Blue ave, Encinada | 15hrs |
| | La la land | 11hrs |
| | 1900 Beach Blvd, Anaheim | 17hrs |
| | 4200 Yellow st., Long Beach | 5hrs |
| | 14 Hollywood blvd, Hollywood | 8hrs |

(5 Hours Passed)

Fig. 7B

| Today | Destination | Time |
|---|---|---|
| Today's Plan Update | 15435 Jeffrey Rd. Irvine | 21hrs |
| | 222 Pink ave, Tustin | expired |
| | LAX Airport | 5hr |
| | 444 Blue ave, Encinada | 20hrs |
| | La la land | 16hrs |
| | 1900 Beach Blvd, Anaheim | 22hrs |
| | 4200 Yellow st., Long Beach | 10hrs |
| | 14 Hollywood blvd, Hollywood | 13hrs |

(5 Hours Passed)

Fig. 7C

| Today | Destination | Time |
|---|---|---|
| Today's Plan Update | 15435 Jeffrey Rd. Irvine | expired |
| | 222 Pink ave, Tustin | expired |
| | LAX Airport | 10hrs |
| | 444 Blue ave, Encinada | expired |
| | La la land | 21hrs |
| | 1900 Beach Blvd, Anaheim | expired |
| | 4200 Yellow st., Long Beach | 15hrs |
| | 14 Hollywood blvd, Hollywood | 18hrs |

METHOD AND APPARATUS FOR UPDATING UNFINISHED DESTINATIONS SPECIFIED IN NAVIGATION SYSTEM

FIELD OF THE INVENTION

This invention relates to a method and apparatus for use in a navigation system for updating destinations inputted in a navigation system, and more particularly, to a method and apparatus for updating unfinished destinations in the navigation system when one or more destinations have not been reached within a predetermined time limit.

BACKGROUND OF THE INVENTION

A navigation system performs travel guidance for enabling a user to easily and quickly reach the selected destination. A typical example is a vehicle navigation system where a navigation system is installed in a vehicle such as an automobile, boat, bicycle, and the like. The present invention is not limited to a vehicle navigation system but is applicable to other types of navigation systems such as a PDA (personal Data Assistant), a cellular phone, and other portable navigation devices. However, for the convenience of explanation, the following description is made mainly for the vehicle navigation system.

Such a navigation system detects the position of the vehicle, reads out map data pertaining to an area at the current position of the vehicle from a storage medium, for example, a CD-ROM (compact disk read-only memory) or a DVD (digital versatile disc), and displays a map image on a monitor screen (display) while superposing a mark representing the current location of the vehicle on a predetermined portion of the map image. Alternatively, such map data can be provided to the user's navigation system from a remote navigation server through a communication network such as an Internet.

When a destination is set, the navigation system starts a route guidance function for guiding the user through a guided route from the start point to the destination. To determine the guided route to the destination, the navigation system calculates and determines an optimum route to the destination based on various parameters. During the route guidance, when the vehicle is within a predetermined distance of an intersection it is approaching, an intersection guidance diagram is displayed to inform the user of the desired one of roads or directions selectable at the intersection. Such route guidance by the navigation system is also given by voice instructions.

Figure 1A:
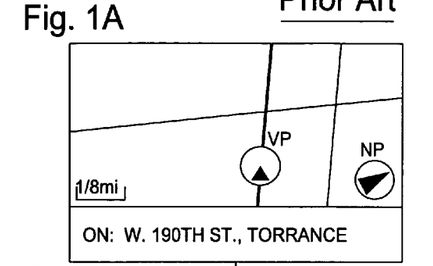
FIGS. 1A–1H are schematic diagrams showing an example of process and screen display of a navigation system involved in the prior art technology for specifying one or more destinations, determining routes to the destinations, and guiding a user to the destinations.
Figure 1B:
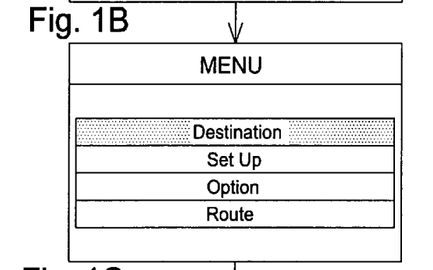

FIGS. 1A–1H show an example of overall procedure and screen display involved in the navigation system. FIG. 1A shows an example of locator map screen of the navigation system typically used when the destination is not specified. The navigation system displays a street on which the vehicle (current vehicle position VP) is running on a map image and a name of the street. Other information such as a north pointer NP, a map scale and a current time may also be illustrated on the display screen.

Figure 1C:
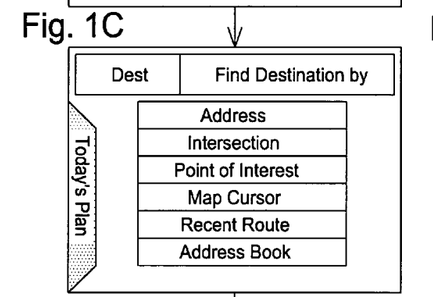
Figure 1D:
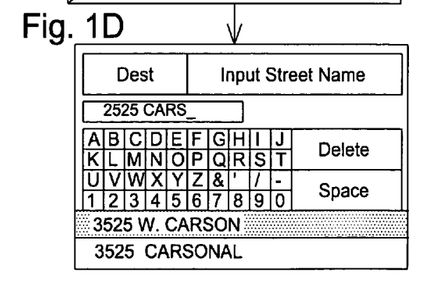

FIGS. 1B–1F show an example of process for specifying a destination in the navigation system. When selecting a "Destination" menu on a main menu screen of FIG. 1B, the navigation system displays an "Find Destination By" screen as shown in FIG. 1C for specifying an input method for selecting the destination. The "Find Destination By" screen lists various methods for selecting the destination, which include "Address", "Intersection", "Point of Interest (POI)", "Recent Route", "Address Book", and "Today's Plan".

Figure 1E:
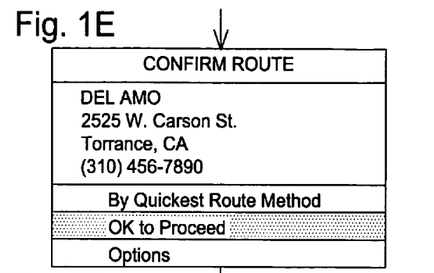

The input method "Today's Plan" is to specify two or more destinations in the navigation system and is directly related to the present invention. When selecting the "Today's Plan" method in FIG. 1C, the navigation system displays a keyboard screen in FIG. 1D. Suppose the user inputs an address or a place name of the destination, the navigation system displays a "Confirm Destination" screen such as shown in FIG. 1E. If the name and address on the screen shows the correct destination, the user enters an "OK to Proceed" key to proceed to the next procedure.

Figure 1F:
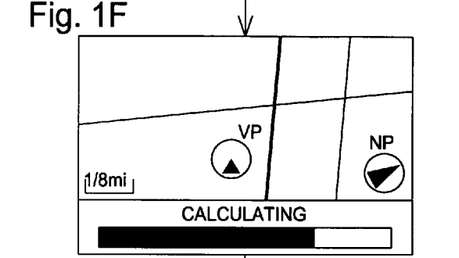

In FIG. 1F, the navigation system calculates and determines a route to the destination, i.e., the address "2525 W. Carson". The navigation system determines a route to the destination based on, for example, the quickest way to reach the destination, the route using many free ways as possible or the route without using toll road, and the like. Since the "Today's Plan" method allows the user to input two or more destinations, the foregoing procedure for specifying a destination and calculating the route to the destination will be repeated.

Figure 1G:
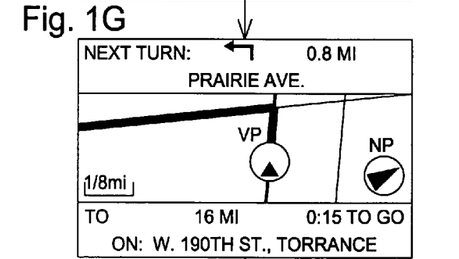
Figure 1H:
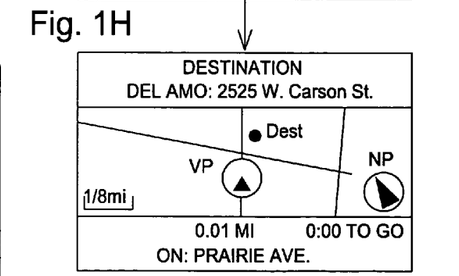

Once the route to the destination is determined, the navigation system starts the route guidance as shown in FIG. 1G for guiding the user to the destination. Typically, the navigation system shows an intersection that is highlighted on the display to show the next turn and a direction of the turn. When the user approaches the destination with such a predetermined distance, the navigation system indicates that the destination is ahead as shown in FIG. 1H. The navigation system detects the actual arrival at the destination based on various factors such as stop of the engine.

Figure 2A:
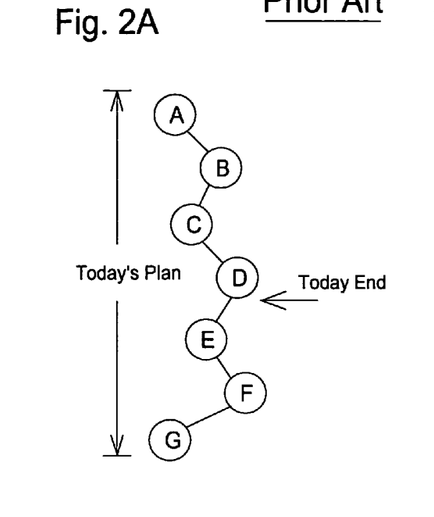
FIGS. 2A–2F are schematic diagrams showing an example of process and screen display of a navigation system involved in the prior art technology when there are one or more unfinished destinations at the end of the day in the "Today's Plan" mode.

As in the above example, when the "Today's Plan" method is selected in FIG. 1C, the user can input a plurality of destinations that will be visited during the course of the day as shown in FIG. 2A. Then the navigation system calculates an efficient order and route to those destinations. For example, to determine the next destination and its route, the navigation system seeks a next destination that is located at the shortest distance from the current destination (considering not only a physical distance but also a time and fees, i.e., an overall cost). In the example of FIG. 2A, the user planed to visit the destinations A–G within a day.

Figure 2B:
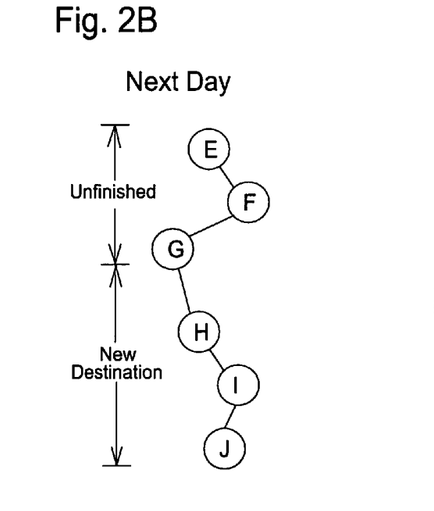

However there are often times when a user cannot visit all of the destinations in the list. In FIG. 2A, the user finished visiting the destinations A–D on that day, however, destinations E, F and G are unfinished by the end of the day. Typically, when a user could not arrive at all of his destinations, the navigation system stores the remaining destinations in its memory so that it could be used in the future. Thus, on the next day, when the user inputs new destinations H, I and J, destinations stored in the navigation system are both the unfinished destinations E–G and the new destinations H–J as shown in FIG. 2B.

Figure 2C:
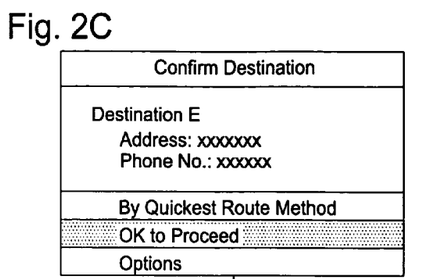
Figure 2D:
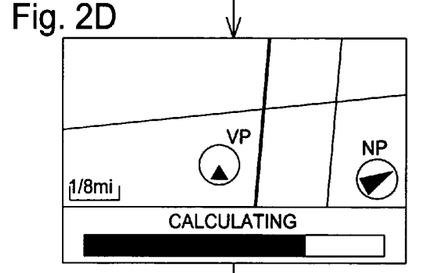
Figure 2E:
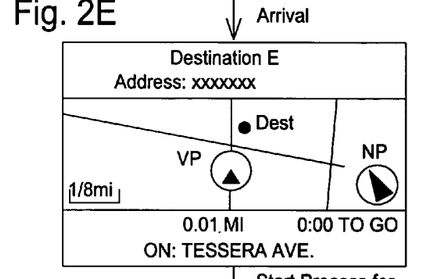
Figure 2F:
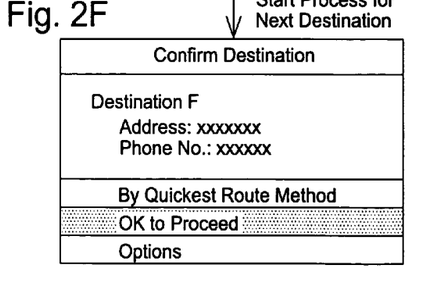

Accordingly, the navigation system asks the user to confirm the destination E which is unfinished yesterday as shown in FIG. 2C and starts route calculation as shown in FIG. 2D. The navigation system guides the user to the destination E, and detects the arrival at the destination E as shown in FIG. 2E. Then, as shown in FIG. 2F, the navigation system repeats the above procedure for the next unfinished destination F and G.

This seemingly useful feature creates confusion often times because whenever the user goes back to the list, the previous destinations still exist in the navigation system as a list of "Today's Plan" even when the user no longer interested in going to those destinations. Then the user has to erase all of the unwanted destinations on the list before or after inputting new destinations. Typically, when erasing such unwanted destinations from the destination list, the user has to go through series of key strokes and scrolling, which is time consuming.

Therefore, there is a need for a navigation system which is able to update the list of destinations to avoid confusion by the user in the "Today's Plan" mode. There is a need for a navigation system that can provide the user with an easy way to choose which destinations are still desired to be remained in the navigation system so that a new list containing old destinations and new destinations can all be processed. Not only in the "Today's Plan" method, but also there is a need in a normal mode, where only one destination is set, that the navigation system provides means to choose whether to delete or renew the unfinished destination.

SUMMARY OF THE INVENTION

It is, therefore, an object of the present invention to provide a navigation method and apparatus for updating unfinished destinations for a navigation system with simple procedure and key operations.

It is another object of the present invention to provide a navigation method and apparatus for measuring a time passage for each destination and providing means for selecting either to delete or renew the destination when the time passage exceeds the predetermined time limit.

In the present invention, the navigation method and apparatus is designed so that updating multiple destinations in a list of destinations to be traveled can be done with ease. Typically, the user inputs such destinations in the navigation system when using an input method of "Today's Plan" mode. The navigation system calculates the effective ways to visit all of the destinations until the last destination. When the user has not arrived at one or more destinations on the destination list within a predetermined time limit, the navigation system sends a notice to the user to prompt the user to select either to delete or renew the unfinished destination.

More specifically, the method of the present invention for updating an unfinished destination specified in a navigation system, includes the steps of: inputting one or more destinations in the navigation system; measuring a time passage for each destination starting from a time when the destination is set in the navigation system; comparing the measured time passage with a predetermined time limit and reporting the user that the destination is expired when the time passage exceeds a predetermined time limit; and deleting or renewing the expired destination in response to the user's instruction. When the expired destination is renewed, a time passage for the renewed destination is newly measured from a time of the renewal.

Preferably, the step of measuring the time passage includes a step of creating a time stamp for each destination which records a set-up time which is a time when a particular destination is set in the navigation system wherein the time passage is measure starting from the set-up time. The time stamp measures the time passage without regard to whether an engine of a vehicle is on or off. The time stamp changes the set-up time to a new set-up time when the corresponding destination is renewed, thereby measuring the time passage for the renewed destination starting from the new set-up time.

Preferably, the step of reporting the user that the destination is expired includes a step of displaying a message with a small space on a route guidance screen of the navigation system to indicate that an update procedure is need for the expired destination. Further, the step of deleting or renewing the expired destination includes a step of displaying a message box which announces that there is an expired destination and prompts the user to decide whether the expired destination should be deleted or renewed.

The message box is displayed as a pop-up screen superimposed on a time stamp screen listing one or more time stamps wherein the message box includes keys for the user to select for deleting or renewing the expired destination. The message box is displayed on the screen of the navigation system by an instruction of the user without regard to whether the vehicle is in motion or in stationary. Alternatively, the message box is displayed on the screen of the navigation system only when the vehicle is stationary.

Another aspect of the present invention is a navigation system configured by various means for achieving the navigation method described above. The navigation system establishes the time stamps of the destinations and measures the time passage for each destination. The navigation system compares the measured time with the predetermined time limit to determine if the destination is expired. When the measured time exceeds the predetermined time length, the navigation system provides a message, such as by a pop-up screen, to the user to select either to delete or renew the expired destination.

According to the present invention, the navigation method and apparatus greatly simplifies the process of updating destinations in the navigation system. The user can delete the unwanted destinations in the navigation system easily with small number of steps. The time stamp for each destination measures the time passage from the initial set-up time of the destination, and when the measured time exceeds the predetermined time length, such as 24 hours, the navigation system provides a message to the user to decide either to delete or renew the expired destination. Accordingly, the navigation method and system enables the user to update destinations by removing the unwanted destinations and renewing the desired destinations with ease. The present invention can be advantageously applied to the "Today's Plan" mode which involves a plurality of destinations. However, the present invention can also be useful in the normal mode which involves a single destination with a predetermined or user specified time limit.

DETAILED DESCRIPTION OF THE INVENTION

The present invention will be described in detail with reference to the accompanying drawings. The navigation system in the present invention is designed so that updating unwanted destinations in a navigation system can be done with ease without many key strokes or page scrolling. The present invention is advantageously applicable to the situation where the user sets many destinations in the "Today's Plan" mode where there remains unfinished one or more destinations by the end of the day. The present invention is also useful in the normal mode where only one destination is specified in the navigation system but the user has not reached the destination within a predetermined time limit.

In order to achieve this objective, the navigation system checks the time passage of each destination and queries the user whether to erase the expired destination or to keep it for future use. Thus, the user is saved the burden of manually going through various pages, and key strokes to delete the unwanted destinations. Furthermore, since the navigation system notifies the user every time there is an expired destination in the system, the user does not have to remember to erase the unwanted destinations. Moreover, the unfinished destinations are not automatically accumulated in the memory of the navigation system. Consequently, confusion that could be created when the user does not remember if the destination is of the old trip or the new trip, etc., can be avoided.

Figure 3:
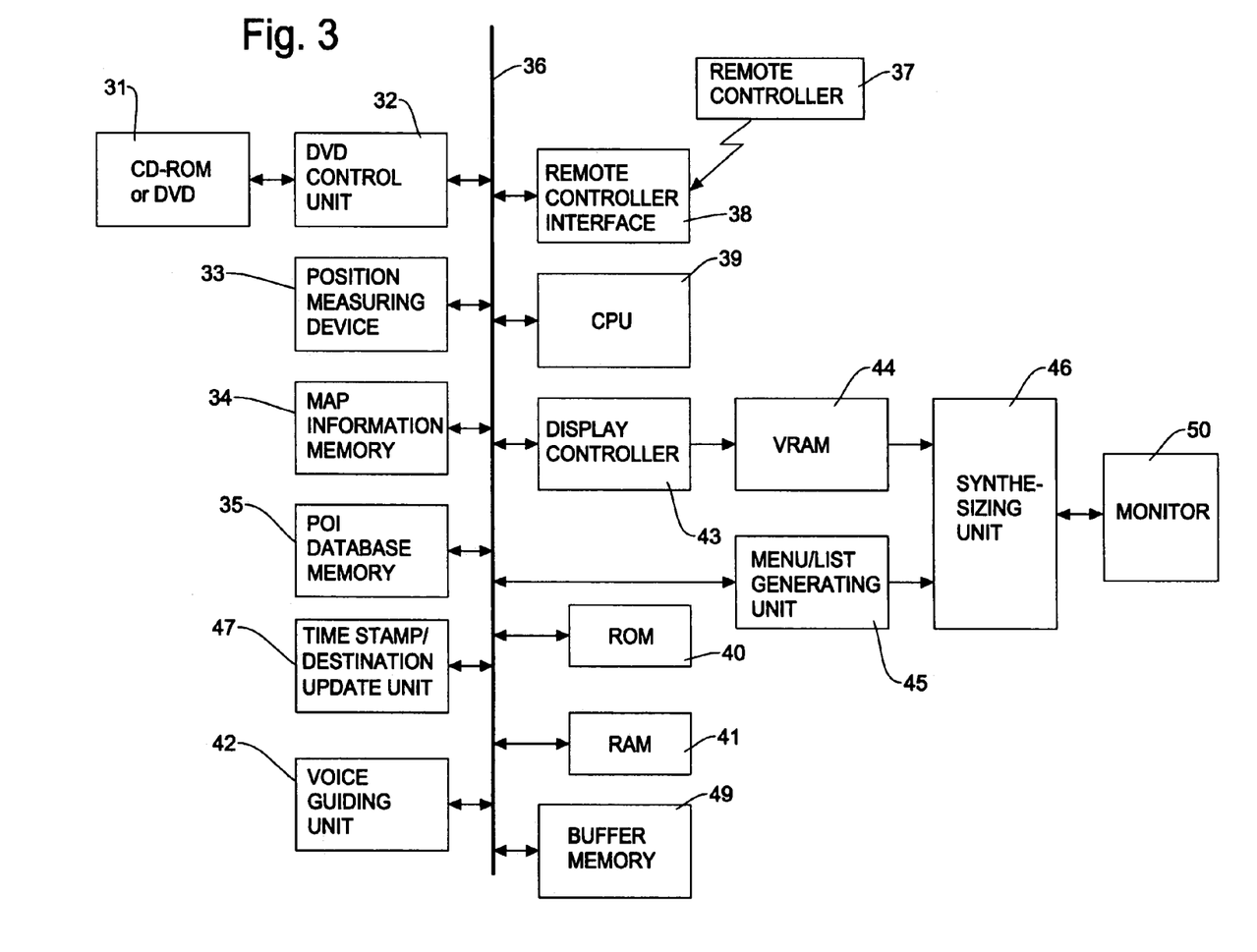
FIG. 3 is a block diagram showing an example of structure in the vehicle navigation system for implementing the present invention.

FIG. 3 shows a structure of a vehicle navigation system for implementing the present invention. While the vehicle navigation system is explained for an illustration purpose, the present invention can also be applied to other types of navigation system such as a portable navigation device implemented by a PDA (personal digital assistant) device or other hand-held devices.

In the block diagram of FIG. 3, the navigation system includes a map storage medium 31 such as a CD-ROM, DVD, hard disc or other storage means (Hereafter "DVD") for storing map information, a DVD control unit 32 for a controlling an operation for reading the map information from the DVD, a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (Global Positioning System) receiver, and etc.

The block diagram of FIG. 3 further includes a map information memory 34 for storing the map information which is read from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

Although a remote controller such as described above is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a voice interface and guiding unit 42 for voice communication interface and spoken instructions, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a time stamp and destination update control unit 47, a buffer memory 49, and a monitor (display) 50.

The time stamp and destination update control unit (hereafter "update control unit") 47 plays a major role in the present invention. The update control unit 47 creates a time stamp which records a time passage every time when a destination is set in the navigation system. The time stamp records the time passage regardless of whether the vehicle engine is on or off. The update control unit 47 checks whether each of the specified destinations has been reached based on, for example, an arrival detection signal.

If the user has arrived at the destination within a predetermined time limit, the update control unit 47 removes the destination from the time stamp. In the case where the user has not reached the destination within the predetermined time, the update control unit 47 notifies the user that the destination is expired and asks the user whether the expired destination should be deleted or renewed. When the user responds to delete the expired destination, the navigation system removes the destination from the destination list. When the user responds to update the destination, the update control unit 47 creates a new time stamp (resets the old time stamp) to record the time passage for the updated destination. Preferably, the buffer memory 49 is provided to temporarily store the data representing destinations and time passages.

Figure 4:
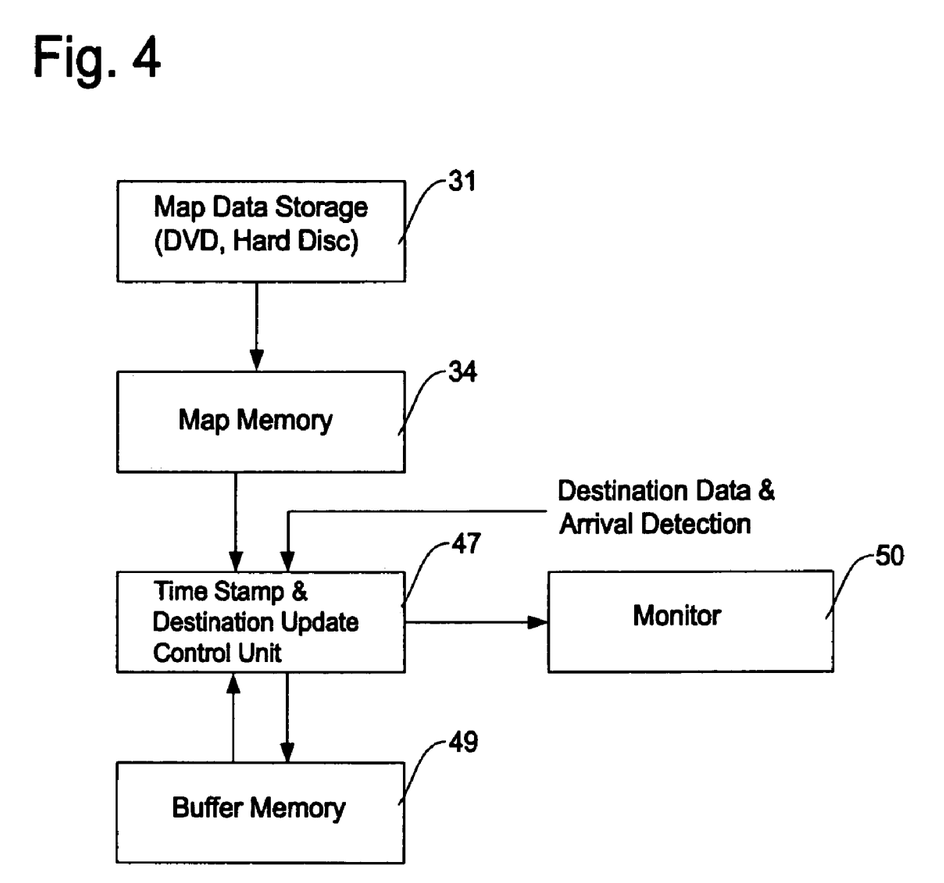
FIG. 4 is a block diagram showing an example of structure in the vehicle navigation system showing the essential components extracted from the block diagram of FIG. 3 for implementing the present invention.

FIG. 4 is a schematic block diagram showing an example of structure in the navigation system for implementing the present invention. The block diagram of FIG. 4 shows the essential components extracted from the block diagram of FIG. 3 that are directly related for implementing the present invention. As noted above, the navigation system checks whether the destinations are reached within a predetermined time and if not, asks the user whether the expired destination should be deleted or renewed.

The block diagram of FIG. 4 includes a map data storage 31, a map memory 34, an update control unit (time stamp and destination update control unit) 47, a buffer memory 49, and a monitor 50, all of which are also shown in the block diagram of FIG. 3. The update control unit 47 can be a part of the CPU 39 in the block diagram of FIG. 3. The buffer memory 49 can be a part of the RAM 41 in the block diagram of FIG. 3.

The map data storage 31 stores map data which is the database of the navigation system. The map data storage 31 is a DVD, CD-ROM, hard disc or any other storage medium that can store a large volume of map data. In the case where the navigation system is established in combination with a navigation data server at a remote location through a communication network such as Internet, such map data can be provided to the user from a map data storage in the data server. Under the control of the CPU 39 (FIG. 3), the map data is extracted from the map data storage 31 and is sent to the map information memory 34 so that the update control unit 47 can access the data.

The update control unit 47 receives the data indicating the route to the destination from the CPU 39 and the map data from the map memory 34. The update control unit 47 also receives data showing a destination and a time when each destination is set. In the case where the navigation system is in the "Today's Plan" mode and the user sets two or more destinations in the navigation system, the update control unit 47 receives a list of such destinations and the set-up times of the destinations.

Based on the received data, the update control unit 47 creates a time stamp for each destination which measures the time passage from the set-up time of each destination. The buffer memory 49 temporarily stores data such as the set-up time or a reset time of each destination for processing by the update control unit 47. The update control unit 47 examines the map data, the destination data, and the arrival detection data to determine whether the user has arrived at the destination within a predetermined time such as 24 hours. For example, in the "Today's Plan" mode, the update control unit 47 checks whether one of the destinations has been reached based on the map data, destination data and arrival detection signal.

If the destination has been reached within the predetermined time, the update control unit deletes the time stamp for the destination. In this manner, the update control unit 47 monitors all the destinations as to whether any of the destination exceeds the predetermined time limit. If the time passage for one or more destinations exceeds the time limit, i.e., the destination is expired, the update control unit 47 controls the monitor 50 to show a message on the screen to notify the user that the update is needed. In response to the notice, the user will decide whether the expired destination should be deleted from the destination list or renewed. If the user instructs the renewal, the update control unit 47 resets the time stamp to measure the time passage anew, and starts the route guidance to the destination when appropriate.

Figure 5A:
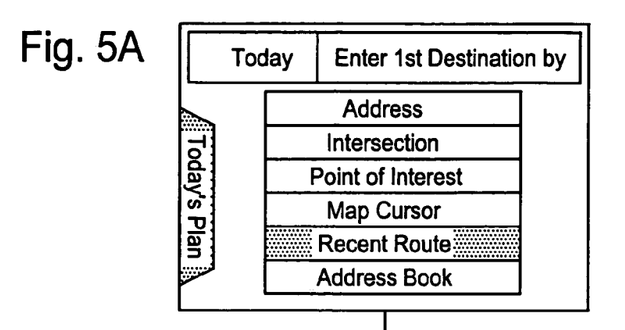
FIGS. 5A–5D are schematic diagrams showing an example of process and screen display of the navigation system of the present invention when the "Today's Plan" mode is used for selecting a plurality of destinations.
Figure 5B:
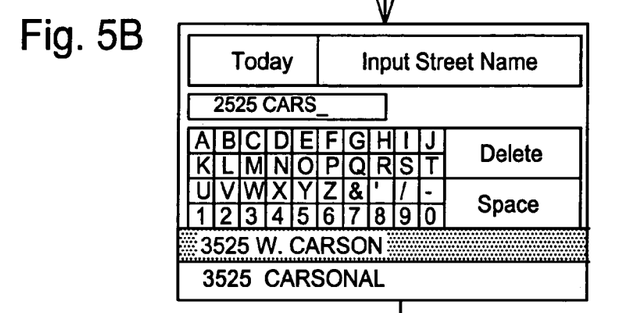

Now, the present invention will be described in detail with reference to FIGS. 5A–5D and 6A–6E for the case where the "Today's Plan" mode is used for selecting the two or more destinations. By selecting "Today's Plan" in the menu shown in FIG. 1C, the user can enter multiple destinations to visit during the course of a day. The navigation system provides a screen as shown in FIG. 5A which prompts the user to input the first destination. The user inputs the first destination through the keyboard of FIG. 5B or other means such as extracting the destination from the "Recent Route", "Address Book" or "Map Cursor", etc.

Figure 5C:
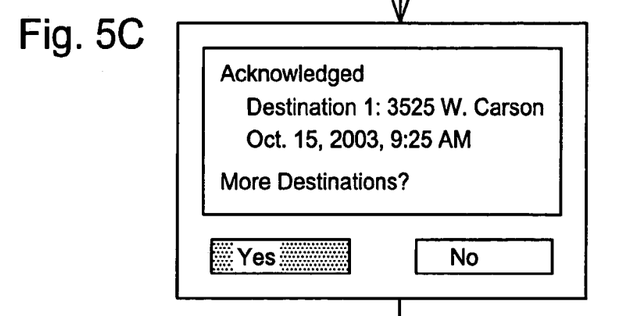
Figure 5D:
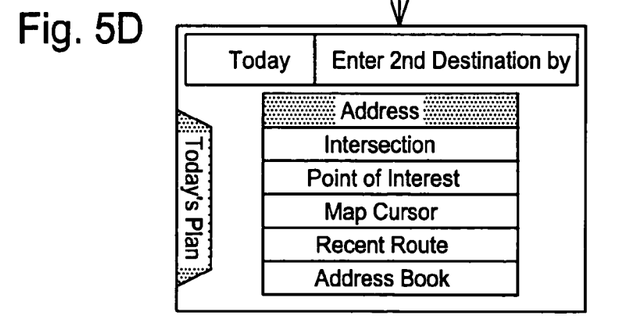

The navigation system confirms the first destination on the screen as shown in FIG. 5C and asks whether there are further destinations. In this example, the navigation system also shows the set-up time that the first destination is set in the navigation system so that the time stamp counts the clock starting from the set-up time. If the user wants to input another destination, he selects the "Yes" key on the screen of FIG. 5C and input the second destination as shown in FIG. 5D. In this manner, two or more destinations are set in the navigation system in the "Today's Plan" mode where each destination has a set-up time.

The time stamp measures the time passage from the set-up time of each destination to see whether the destination has been reached within a predetermined time limit. For example, in the "Today's Plan" mode, the predetermined time limit is 24 hours. Thus, in the case where the user has not arrived at one of the destinations within 24 hours from the set-up time of the particular destination, the navigation system notifies the user that the destination is expired and prompts the user to decide whether this destination should be deleted or updated. It should be noted that the user can freely set and change the time limit in a system set-up process.

In the conventional technology, if the user did not reach some of the destinations in the previous day, the navigation system stores all those unfinished destinations for the user to driver there in the future. This, however, causes to mix up the destinations that the user wants with the destinations that the user no longer wants to reach. This is because a large number of destinations that he had not reached will be accumulated without much reference as to when the user attempted to reach those destinations. In the present invention, however, the navigation system establishes the time stamp on each destination to check the time passage so that the above problem can be resolved.

Figure 6A:
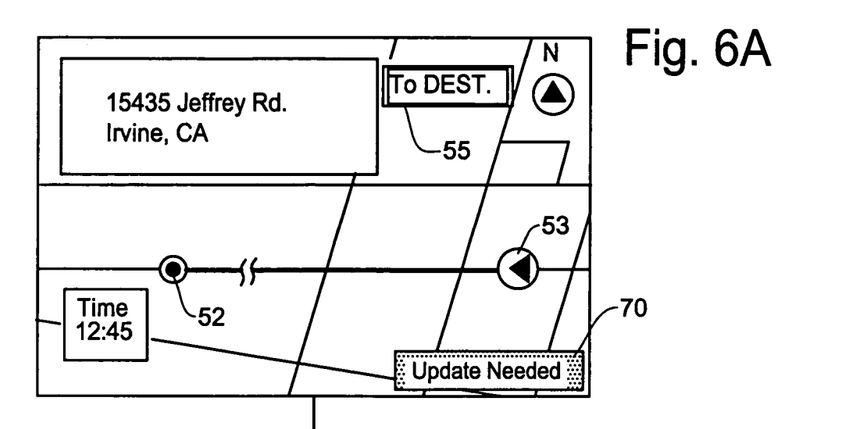
FIGS. 6A–6E are schematic diagrams showing an example of process and screen display of the navigation system of the present invention when one or more destinations specified in the "Today's Plan" mode are expired.

The schematic diagrams of FIGS. 6A–6E show an example of process and screen display of the navigation system of the present invention when one or more destinations specified in the "Today's Plan" mode are expired. The navigation system guides the user to the destination as shown in FIG. 6A where the user's current position 53 is away from the destination 52. Suppose the predetermined time length, for example, 24 hours, has passed before reaching one of the destinations from the time when the destination is set, as shown in FIG. 6A, a small prompt 70 appears on the screen during the route guidance to let the user know of a need for an update.

As shown in FIG. 6A, this prompt 70 is small in size so that the user is not disturbed from the safe driving. This prompt could also be a small icon that pops up at the corner of the screen. Furthermore, it is also possible that, without using the prompt 70, or the message box 72 in FIG. 6B, the updating process could be done only when the vehicle is in a stationary state and the vehicle's engine is turned on so that it promotes even safer driving. As noted above, the time stamp keeps measuring the time passage without regard to whether the vehicle engine is on or off. This method of updating will be explained in more detail later with reference to FIGS. 7A–7C.

Figure 6B:
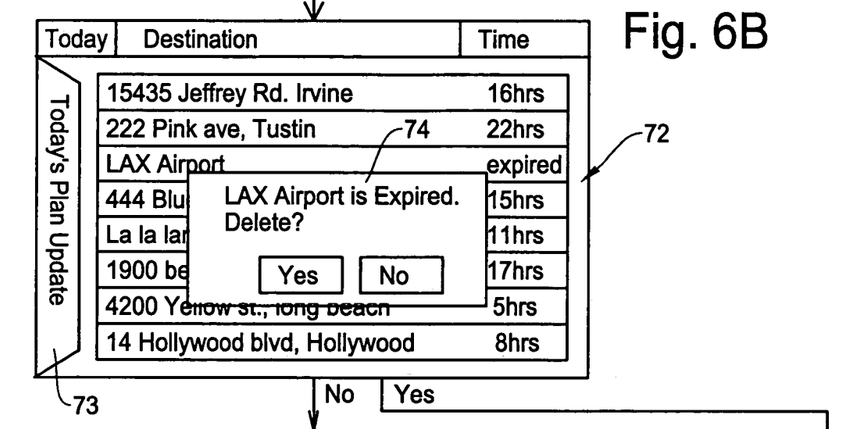

When the user acknowledges the need for updating, the user could tap the prompt 70 to go to a "Today's Plan Update" screen shown on FIG. 6B. In this example, the navigation system displays a pop-up screen 74 which is superimposed on a time stamp screen 72 and asks whether the expired destination should be deleted or renewed. Alternatively, it is also possible that the navigation system directly displays the pop-up screen 74 of FIG. 6B without using the prompt 70 in FIG. 6A. However, it is preferable that the user can decide whether or not to go to the screen of FIG. 6B by pressing the prompt 70 since he may be in a critical situation in the route guidance mode and want to maintain the route guidance screen.

In the example of FIG. 6B, the navigation system queries the user if the expired destination can be erased. In this example, the pop-up screen 74 says "LAX Airport is Expired. Delete?". If the user does not want the expired destination "LAX Airport" any longer, he can delete the destination from the navigation system simply by tapping the "Yes" button on the screen or by using a remote controller (FIG. 3). If the user wants to keep the expired destination, the user could do so by selecting "No", in which case the navigation system will keep the destination in the memory and also reset the time stamp so that it counts down the clock to measure the time passage.

Figure 6C:
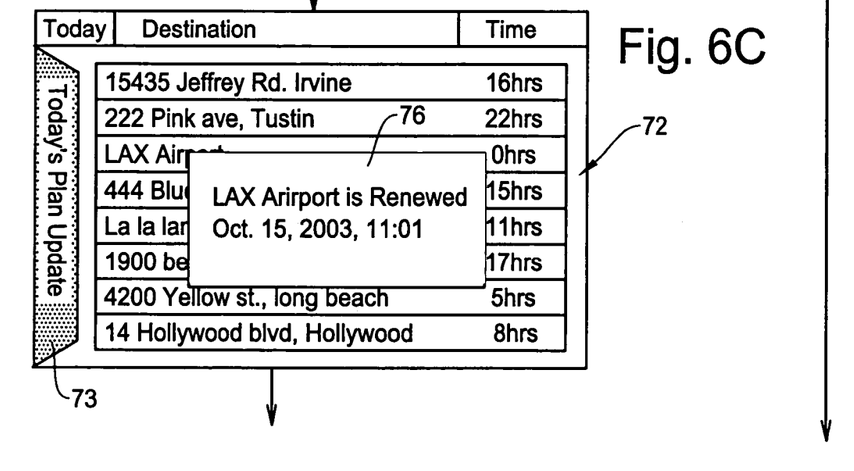

As shown in FIG. 6C, when the user selects the "No" key, the navigation system maintains the expired destination and acknowledges that the destination is renewed by a pop-up screen 76. An example of message on the pop-up screen 76 is "LAX Airport is Renewed" accompanied by a new set-up time, although other way of acknowledgement is possible. At the same time, the navigation system resets the time stamp of "LAX Airport" to zero so that the system measures the time passage for the next 24 hours.

In this example, the user can also access the "Today's Plan Update" screen by tapping on a key 73 in FIGS. 6B and 6C. Suppose the user hits the "Today's Plan Update" key 73 in FIG. 6C, the navigation system shows the time stamp screen 72 of FIG. 6D which lists the time stamp showing the time passage for each remaining destination. Since the destination "LAX Airport" is renewed, the time stamp of this destination shows zero.

Figure 6D:
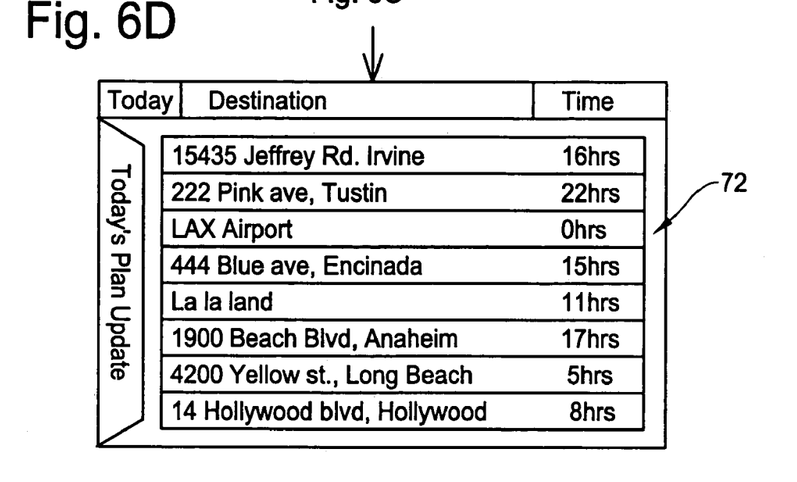
Figure 6E:
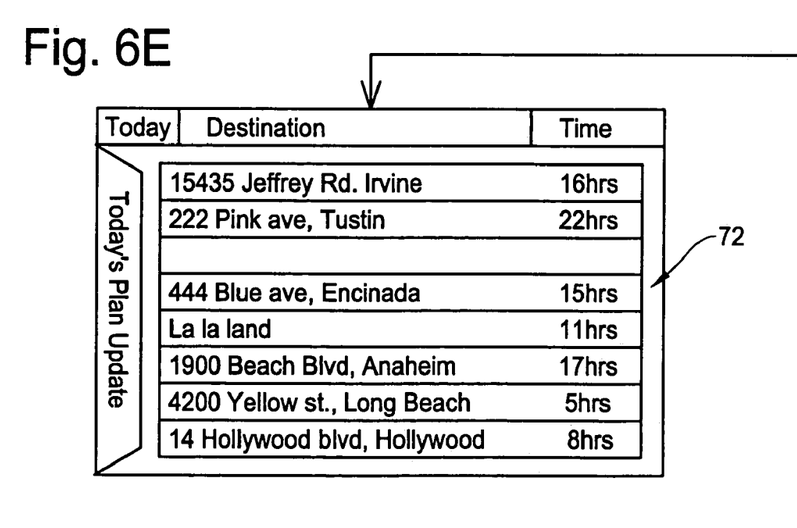

In the case where the "Today's Plan Update" key 73 is activated after deleting the expired destination "LAX Airport", the navigation system shows the time stamp screen 72 of FIG. 6E which has no time stamp for "LAX Airport". In the example of FIGS. 6D and 6E, since there is no expired destination, no pop-up screen such as screens 74 and 76 of FIGS. 6B and 6C is displayed. However, if one or more destinations have been expired, the same procedure as shown in FIGS. 6B and 6C will be repeated. As can be seen in FIGS. 6D and 6E, the user can check how much time is remaining on each destination. The user can also check how many more destinations are still remained in the navigation system.

When the user turns off the vehicle engine, the navigation system stores the destinations that the user have not reached. One or more destinations stored in the memory will be expired during the time when the user turns off the engine. Then, when the user turns on the ignition again, the navigation system displays a time stamp screen 72 and suggests the user to go to the "Today,s Plan Update" screen as shown in FIGS. 7A–7C.

Figure 7A:
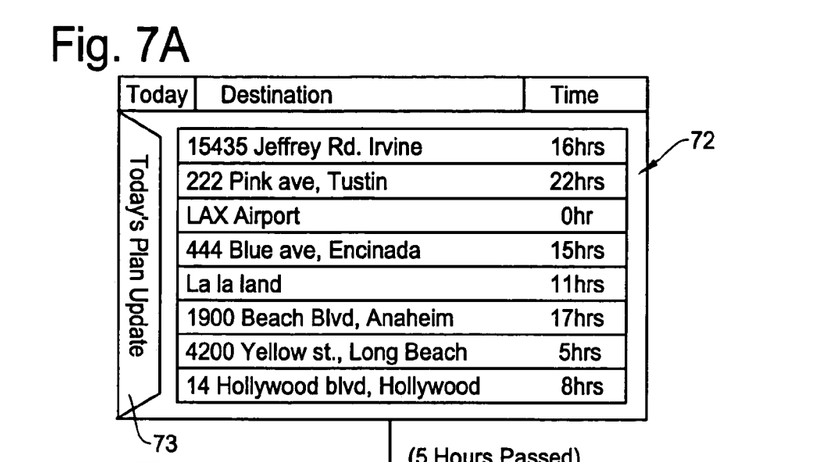
FIGS. 7A–7C are schematic diagrams showing an example of process and screen display of the navigation system of the present invention where the time stamp screen changes its contents upon passage of time.

FIG. 7A shows the time stamp screen 72 immediately after the renewal of the expired destination shown in FIG. 6C, and thus the same as that shown in FIG. 6D. FIG. 7B shows the time stamp screen 72 when the vehicle engine is turned on five hours after the situation of FIG. 7A. Thus, the time stamp of each destination is advanced by five hours from that of FIG. 7A. FIG. 7C shows the time stamp screen 72 when the vehicle engine is turned on at another five hours after the situation of FIG. 7B. Thus, the time stamp of each destination is advanced by five hours from that of FIG. 7B.

Figure 7B:
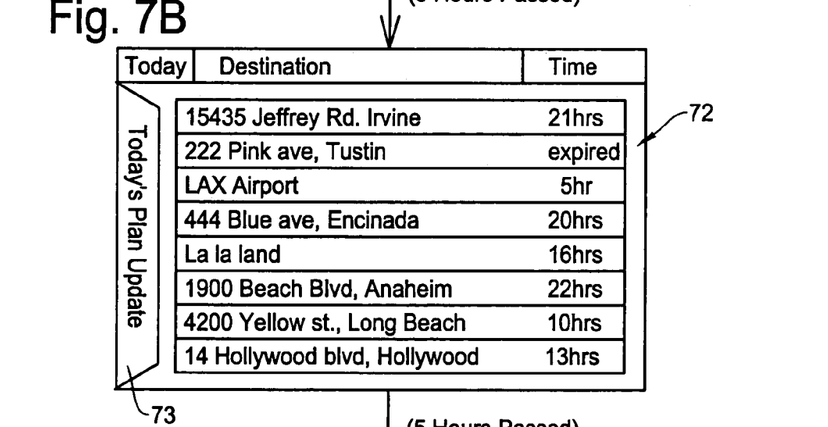
Figure 7C:
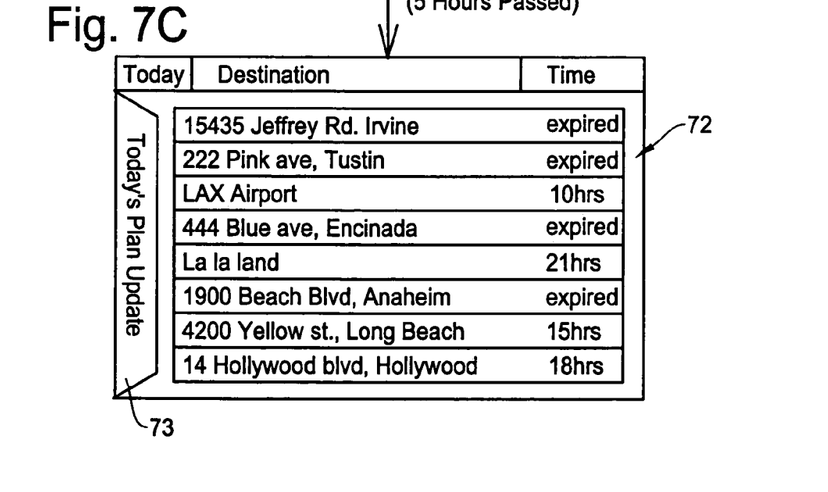

Since there are destinations that are expired (more than 24 hours passed) in FIGS. 7B and 7C, by pressing the "Today's Plan Update" key 73, the navigation system moves to the pop-up screen of FIG. 6B so that the user can instruct the navigation system either to delete or renew the expired destination. This way, any and all of the destinations that have expired when the vehicle was not in use can be updated with ease. As aforementioned, the user can change the setting of the navigation system so that the navigation system would not pop up a prompt when the vehicle is in the route guidance mode. In such a case, the user would be prompted to update the destination only when the user turns on the vehicle engine or the vehicle is in the stationary state so that the safe driving can be assured.

The foregoing example is directed to the case where the user specified two or more destinations in the "Today's Plan" mode. The present invention can also be applied to the normal mode where the user set one destination, but cannot reach the destination within a predetermined time. FIGS. 8A–8H show an example of process and screen display of the navigation system of the present invention used in the normal mode where the user has not arrived at the destination within the predetermined time limit such as by the end of the day. As noted above, such a time limit can be freely defined in the navigation system by the user.

Figure 8A:
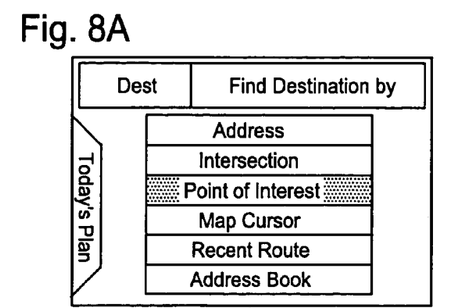
FIGS. 8A–8H are schematic diagrams showing an example of process and screen display of a navigation system of the present invention used in a normal mode where one destination is specified but the user has not arrived at the destination by the end of the predetermined time limit.
Figure 8B:
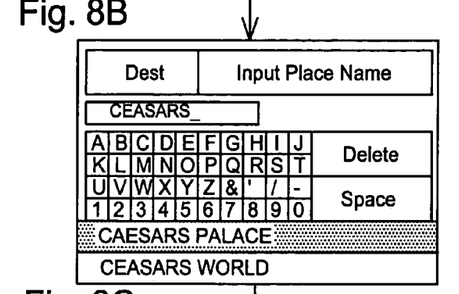
Figure 8C:
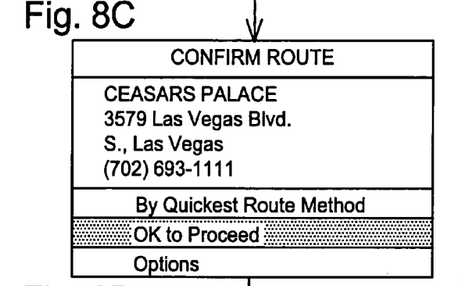
Figure 8D:
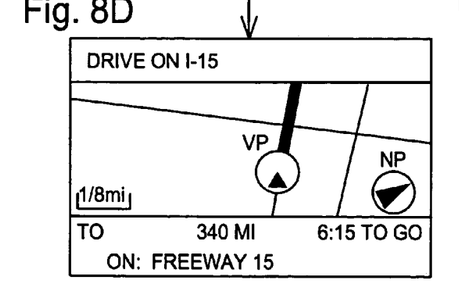
Figure 8E:
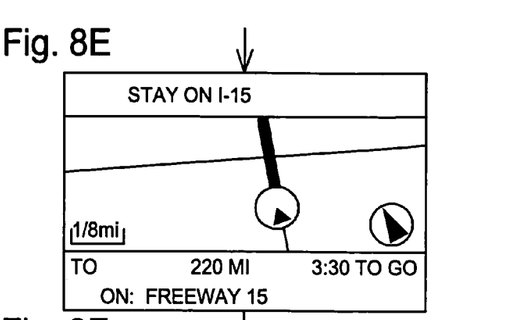

FIGS. 8A–8C show a process for setting the destination in the navigation system, which is basically the same as those shown in FIGS. 1A–1E. FIGS. 8D and 8E schematically show that the navigation system is in the route guidance mode to guide the user to the destination, for example "Ceasars Palace". The user may be delayed in the schedule by various reasons or the user may no longer be interested in going to the original destination.

Figure 8F:
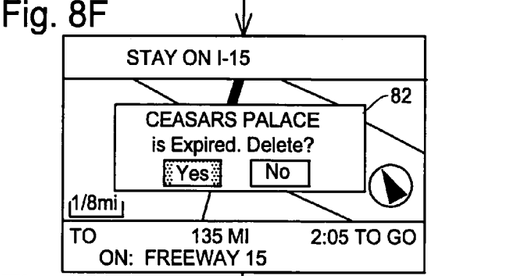
Figure 8G:
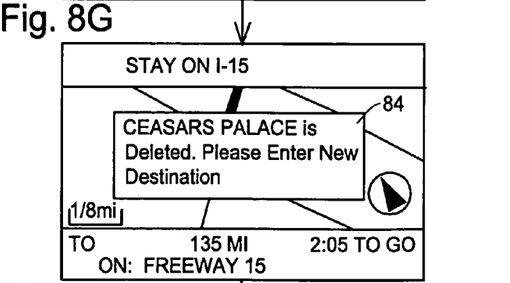
Figure 8H:
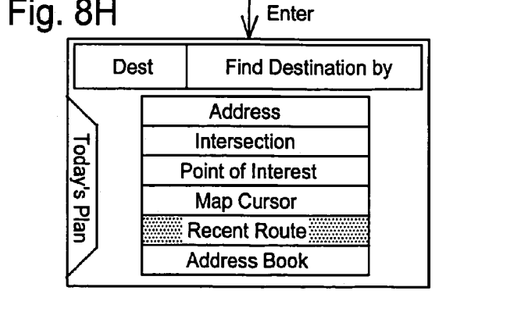

Whatever the reason, suppose the user has not arrived at the destination within the predetermined time limit, the navigation system will display a message box 82 such as shown in FIG. 8F. The message in the message box 82 says "Ceasars Palace is Expired. Delete?". If the user still wants to go to the destination "Ceasars Palace", he presses the "No" key. Then, the navigation system renews the destination "Ceasars Palace" similar to the example of FIG. 6C and starts the route guidance to the destination. At the same time, the navigation system resets the time stamp (not shown) of the destination "Ceasars Palace" to measure the time passage again.

If the user is no longer interested in going to the destination "Ceasars Palace", he presses the "Yes" key in the message box 82 of FIG. 8F. As a result, the navigation system displays a message box 84 shown in FIG. 8G which confirms that the destination is deleted. The message box 84 also prompts the user to enter a new destination. When the user presses an enter key, for example, the navigation system moves to the screen of FIG. 8H for inputting the destination, which is the same as that of FIG. 8A. Thus, the user selects the destination input method and defines the next destination in the navigation system.

As has been described, according to the present invention, the navigation method and apparatus greatly simplifies the process of updating destinations in the navigation system. The user can delete the unwanted destinations in the navigation system easily with small number of steps. The time stamp for each destination measures the time passage from the initial set-up time of the destination, and when the measured time exceeds the predetermined time length, such as 24 hours, the navigation system provides a message to the user to decide either to delete or renew the expired destination. Accordingly, the navigation method and system enables the user to update destinations by removing the unwanted destinations and renewing the desired destinations with ease. The present invention can be advantageously applied to the "Today's Plan" mode which involves a plurality of destinations. However, the present invention can also be useful in the normal mode which involves a single destination with a predetermined or user specified time limit.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for updating an unfinished destination specified in a navigation system, comprising the following steps of:
    inputting one or more destinations in the navigation system;
    measuring a time passage for each destination starting from a time when the destination is set in the navigation system;
    comparing the measured time passage with a predetermined time limit which is a time length commonly applied to all of the destinations and reporting the user that the destination is expired when the time passage exceeds the predetermined time limit; and
    deleting or renewing the expired destination in response to the user's instruction;
    wherein, when the expired destination is renewed, a time passage for the renewed destination is newly measured from a time of the renewal, and when the expired destination is deleted, information regarding the expired destination is erased from the navigation system.

2. A navigation method as defined in claim 1, wherein said step of measuring the time passage includes a step of creating a time stamp for each destination which records a set-up time which is a time when a particular destination is set in the navigation system wherein the time passage is measure starting from the set-up time.

3. A navigation method as defined in claim 2, wherein said time stamp measures the time passage without regard to whether an engine of a vehicle is on or off.

4. A navigation method as defined in claim 2, wherein said time stamp changes the set-up time to a new set-up time when the corresponding destination is renewed, thereby measuring the time passage for the renewed destination starting from the new set-up time.

5. A navigation method as defined in claim 1, wherein said step of reporting the user that the destination is expired includes a step of displaying a message with a small space on a route guidance screen of the navigation system to indicate that an update procedure is necessary for the expired destination.

6. A navigation method as defined in claim 5, wherein said step of deleting or renewing the expired destination includes a step of displaying a message box which announces that there is an expired destination and prompts the user to decide whether the expired destination should be deleted or renewed.

7. A navigation method as defined in claim 6, wherein said message box is displayed as a pop-up screen superimposed on a time stamp screen listing one or more time stamps wherein said message box includes keys for the user to select for deleting or renewing the expired destination.

8. A navigation method as defined in claim 7, wherein said message box is displayed on the screen of the navigation system by an instruction of the user without regard to whether the vehicle is in motion or in stationary.

9. A navigation method as defined in claim 7, wherein said message box is displayed on the screen of the navigation system only when the vehicle is stationary.

10. A navigation method as defined in claim 1, wherein said predetermined time limit is twenty four hours when a plurality of destinations are set in the navigation system which are intended to visit within a day.

11. A navigation apparatus for updating an unfinished destination specified in a navigation system, comprising:
    means for inputting one or more destinations in the navigation system;
    means for measuring a time passage for each destination starting from a time when the destination is set in the navigation system;
    means for comparing the measured time passage with a predetermined time limit which is a time length commonly applied to all of the destinations and reporting the user that the destination is expired when the time passage exceeds the predetermined time limit; and
    means for deleting or renewing the expired destination in response to the user's instruction;
    wherein, when the expired destination is renewed, a time passage for the renewed destination is newly measured from a time of the renewal, and when the expired destination is deleted, information regarding the expired destination is erased from the navigation system.

12. A navigation apparatus as defined in claim 11, wherein said means for measuring the time passage includes means for creating a time stamp for each destination which records a set-up time which is a time when a particular destination is set in the navigation system wherein the time passage is measure starting from the set-up time.

13. A navigation apparatus as defined in claim 12, wherein said time stamp measures the time passage without regard to whether an engine of a vehicle is on or off.

14. A navigation apparatus as defined in claim 12, wherein said time stamp changes the set-up time to a new set-up time when the corresponding destination is renewed, thereby measuring the time passage for the renewed destination starting from the new set-up time.

15. A navigation apparatus as defined in claim 11, wherein said means for reporting the user that the destination is expired includes means for displaying a message with a small space on a route guidance screen of the navigation system to indicate that an update procedure is necessary for the expired destination.

16. A navigation apparatus as defined in claim 15, wherein said means for deleting or renewing the expired destination includes means for displaying a message box which announces that there is an expired destination and prompts the user to decide whether the expired destination should be deleted or renewed.

17. A navigation apparatus as defined in claim 16, wherein said message box is displayed as a pop-up screen superimposed on a time stamp screen listing one or more time stamps wherein said message box includes keys for the user to select for deleting or renewing the expired destination.

18. A navigation apparatus as defined in claim 17, wherein said message box is displayed on the screen of the navigation system by an instruction of the user without regard to whether the vehicle is in motion or in stationary.

19. A navigation apparatus as defined in claim 17, wherein said message box is displayed on the screen of the navigation system only when the vehicle is stationary.

20. A navigation apparatus as defined in claim 11, wherein said predetermined time limit is twenty four hours when a plurality of destinations are set in the navigation system which are intended to visit within a day.

* * * * *